UNITED STATES PATENT OFFICE.

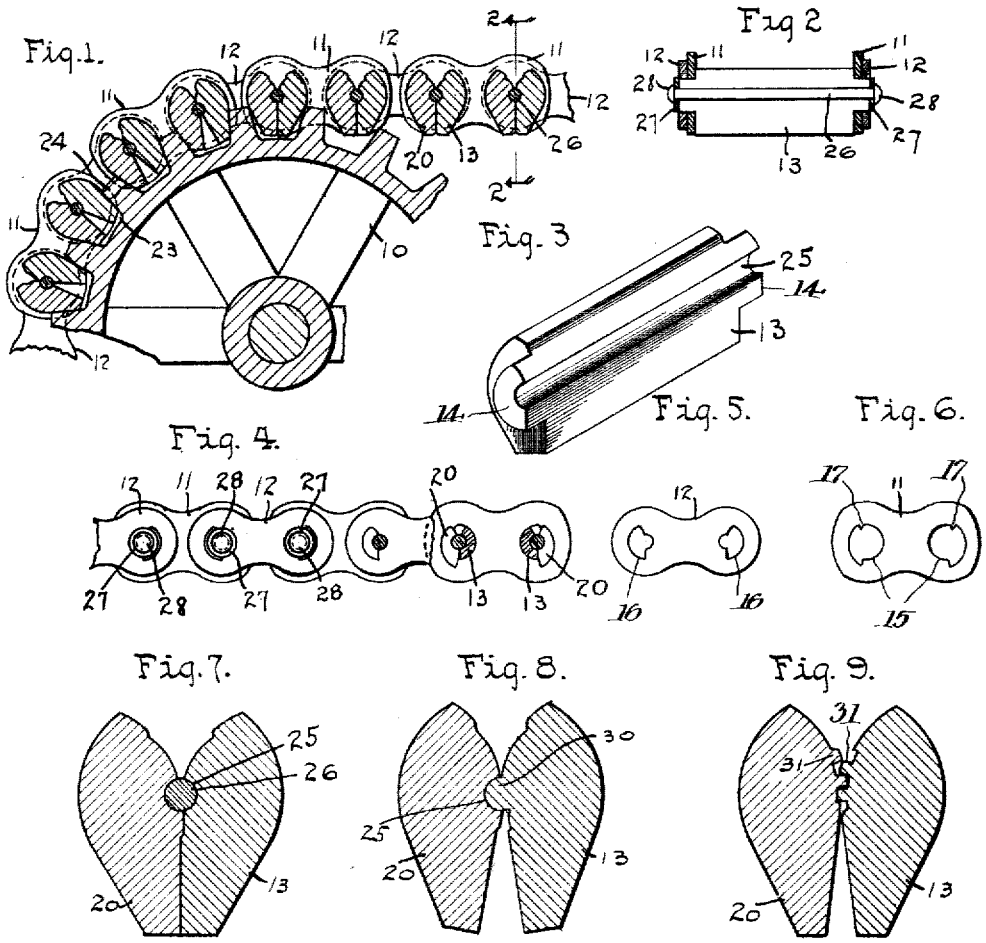

WILLIAM A. ROCKENFIELD, OF INDIANAPOLIS, INDIANA.

SILENT-CHAIN JOINT.

1,273,001.         Specification of Letters Patent.    Patented July 16, 1918.

Application filed May 17, 1915.   Serial No. 28,716.

*To all whom it may concern:*

Be it known that I, WILLIAM A. ROCKENFIELD, a citizen of the United States, and a resident of Indianapolis, county of Marion, and State of Indiana, have invented a certain new and useful Silent-Chain Joint; and I do hereby declare that the following is a full, clear, and exact description thereof, reference being had to the accompanying drawings, in which like letters refer to like parts.

The object of this invention is to pivot together, in some fashion, transverse tooth engaging members pivotally connecting the opposite pairs of overlapping side links of a silent sprocket chain. Silent chains have heretofore been made with opposite pairs of overlapping side links and a transverse tooth engaging member secured to each end of each pair of links, the tooth engaging members connecting the outer links extending through the openings or bearings in the inner links so that the inner links will be pivoted on said longer transverse tooth engaging members, with the transverse tooth engaging members connected with the overlapping ends of the two pairs of links lying adjacent each other so that they perform the double function of pivotally connecting the chain links together and also forming the teeth of the chain. In such construction as heretofore used, the transverse tooth engaging members are independent of each other excepting in so far as they are held together by the links. This causes more or less independent action and play, whereby they do not make perfect teeth to engage and coöperate properly with the teeth of sprocket wheels or racks.

The chief feature of the invention consists in pivoting each pair of transverse tooth engaging members together longitudinally, in some suitable fashion, so that they cannot have any independent vertical play and, therefore, their edges which engage the sprocket wheels or racks are flush with each other and they make a perfect tooth at all times. In properly operating machinery this pivotal arrangement is absolutely necessary to the successful operation of the chain.

The full nature of the invention will be understood from the accompanying drawings and the following description and claims:

In the drawings, Figure 1 is a longitudinal section through a portion of a chain and associated parts of a sprocket wheel, parts being broken away. Fig. 2 is a section on the line 2—2 of Fig. 1. Fig. 3 is a perspective view of the tooth engaging member or oscillatory member. Fig. 4 is a side elevation of a portion of the chain. Figs. 5 and 6 are side elevations of the links. Fig. 7 is a cross section through the tooth engaging members on larger scale. Figs. 8 and 9 are similar sections of modified forms of the tooth engaging members.

There is shown in Fig. 1 of the drawings, a sprocket wheel 10 upon which a silent chain operates. The silent chain consists of alternating inside and outside pairs of overlapping links 11 and 12 respectively, and a transverse tooth engaging member 13 secured to each end of each pair of outside links 12 and a transverse tooth engaging member 20 secured to each end of each pair of inside links 11, and said inside links are pivoted at each end on said tooth engaging member 13, so as to be oscillatory therewith to a sufficient extent to give the chain the desired flexibility.

In combining the parts above mentioned, the tooth engaging member 13 has reduced ends 14 of the same form and cross section as the openings 16 in the outside links 12 so as to be secured therein, and said reduced ends of the tooth engaging members 13 extend through the large portions of the openings 15 in the links 11, which portions of the openings 15 are larger than the cross section of the tooth engaging members 13 so as to allow the tooth engaging members to rock or oscillate against each other, and said rocking movement is limited by the shoulder 17 engaging the adjacent face of the reduced end 14 of the tooth engaging member 13, as shown in Fig. 3.

Since the tooth engaging member 20 is secured in the small portion of the opening 15 of the inner link 11, the two tooth engaging members 13 and 20 are adjacent each other and their adjacent surfaces are formed so that they can rock relative to each other about an axis extending longitudinally of said tooth engaging members and located approximately between the two. The teeth are arranged in connection with the links so that when the chain is straight, the inner surfaces of the two tooth engaging members may be together, as shown at the right-hand portion of Fig. 1, or in Fig. 7. This adapts the chain to coöperate with a sprocket wheel when the chain is curved, as shown in the left-hand portion of Fig. 1. The inner surfaces of the said two tooth engaging members rock away from each other substantially as shown in Fig. 1 and Fig. 8, and therefore the space 23 between the sprocket teeth 24 must be relatively wide to receive such form of chain tooth engaging member, as shown in Fig. 1.

This relative oscillatory movement of the tooth engaging members is about a central bearing between them arranged in the form shown in Figs. 7, 8, and 9. In the first seven figures each tooth engaging member 13 and 20 has on its beveled inner surface about midway thereof a longitudinal semi-circular recess 25 so as to furnish a seat for a pivot pin 26 which lies in said recesses 25 of adjacent tooth engaging members 13 and 20. The pivot pin 26 extends entirely through the chain and has washers 27 on its outer ends, and its extreme ends have rivet heads 28, as shown in Fig. 2. Therefore, as the members 13 and 20 rock with relation to each other, they have the bearing or pivot pin 26 upon which to oscillate. This holds said two members in exactly the desired relation with each other in spite of strain, and prevents any yielding or displacement of said tooth engaging members under stress. It prevents independent vertical movement of said tooth engaging members and, therefore, the inner ends are always flush with each other and fit snugly on a sprocket wheel.

A modified form of the means for pivoting together said tooth engaging members is shown in Fig. 8, wherein only the tooth engaging member 20 has the groove 25, while there is extending integral with the other tooth member 13 a bead-like member 30 which takes the place of the pivot pin 26 and extends entirely through the chain and has on it the washers 27 and the ends are enlarged to form the heads 28.

Still another modified form is shown in Fig. 9 wherein said pivot members 13 and 20 have their adjacent oppositely curved surfaces provided with interengaging teeth 31 so that said members will rock upon each other and still be held from any independent vertical movement or displacement.

The invention is a chain for use on sprocket wheels, rings and the like, so formed that the cross or pivotal members constitute the teeth or tooth engaging members of the chain, as said chain, teeth or tooth engaging members engage the teeth of the sprocket wheel and transmit power thereto or therefrom. The invention does not relate to chains wherein the teeth of the chain are formed on or integral with the side links thereof. In this latter form of chain, the transverse pivotal members do not serve as teeth and do not engage the teeth of the sprocket wheel. By the pivotal members in the improved chain herein set forth being transversely elongated downward, they serve as chain teeth or tooth engaging members for engaging the teeth of the sprocket wheel directly and they are mounted so that they will rock upon their transverse pivots as herein set forth. Therefore, the said links are not teeth or tooth engaging members, but serve only to connect and mount the ends of the transverse pivotal tooth engaging members.

The side links and transverse tooth engaging members form two sets of frames which constitute the chain, each frame consisting of a pair of opposite side links and a transverse tooth engaging member secured to each end of each pair of said side links, one set of said frames being narrower than the other and the narrow frames alternating with the wide frames and pivoted each on a transverse tooth engaging member of the adjacent wide frame. In other words, said wide frames are pivoted to each other by the narrow frames being pivoted on the tooth members of the wider frames. These teeth project inward so as to come in direct working contact with the teeth of the sprocket wheel and rock as the chain bends so that such tooth engaging members can adjust themselves to the surfaces of the sprocket teeth with which they engage as they come into working contact therewith. By "tooth engaging members" is meant a member of the chain which engages the tooth of the sprocket wheel and receives power therefrom or transmits power thereto.

The invention claimed is:

1. A chain formed of opposite overlapping pairs of side links, a transverse tooth engaging member secured to each end of each pair of opposite links and extended inward to form teeth for engaging the teeth of a sprocket wheel, the inner side links being pivoted on the tooth engaging members connecting the adjacent pairs of outer side links and the tooth engaging members connecting the adjacent pairs of links having adjacent convex surfaces with grooves therein extending transversely of the chain and registering with each other, and a pivot pin lying in the grooves in each adjacent pair of tooth engaging members.

2. A chain formed of opposite overlapping pairs of side links, a transverse tooth engaging member secured to each end of each pair of opposite links and extended inward to form teeth adapted to engage the teeth of a sprocket wheel, the inner side links being pivoted on the tooth engaging members connecting the adjacent pairs of outer side links, and the tooth engaging members connecting the adjacent pairs of links having adjacent convex surfaces and grooves in said surfaces extending transversely of the chain and registering with each other, and a pivot pin lying in said grooves between each adjacent pair of said transverse tooth engaging members and extending at its ends through both pairs of links, substantially as set forth.

3. A chain comprising a plurality of links, each of which comprises two longitudinal members and two cross bars, adjacent links overlapping so that a cross bar of each of alternate links is located between the two cross bars of an intermediate link, each cross bar being provided with a plane surface for engaging a tooth of a sprocket wheel, and a pivot bearing member located between each pair of coöperating cross-bars of adjacent links.

4. A silent chain, comprising a plurality of overlapping links, said links comprising longitudinal members and cross bars at both ends of each longitudinal member and extending out of the planes of the longitudinal members, the cross bars at the ends of each link being nearer such ends than are the cross bars at the adjacent ends of the two adjacent links, and the two cross bars at the joint of articulation between two adjacent links having concave surfaces on their adjacent faces, and a pivot pin at each joint of articulation coöperating with said concave surfaces, the cross bars being provided with plane surfaces on the sides remote from the centers of the links of which they form part, and the plane surfaces on the two cross bars of each link being at a fixed angle to each other.

5. A chain, comprising a plurality of overlapping links, said links comprising longitudinal members and cross bars at both ends of each longitudinal member and extending out of the planes of the longitudinal members, the cross bars at the ends of each link being nearer such ends than are the cross bars at the adjacent ends of the two adjacent links, and the two cross bars at the joint of articulation between two adjacent links having concave surfaces on their adjacent faces, and having exposed plane surfaces on their remote faces for direct coöperation with a sprocket, and a pivot pin at each joint of articulation coöperating with said concave surfaces.

6. A silent chain comprising a plurality of links articulated together, each joint of articulation comprising a pivot pin and a pair of cross bars having concave surfaces slidably fitting on said pivot pin, and each cross bar at a joint of articulation forming part of the link which extends from such joint in the opposite direction from said cross bar, said links also having longitudinal members which rigidly connect the two cross bars of each link, said two cross bars of each link being provided with plane surfaces located at a fixed angle to each other on the sides remote from the centers of the links of which they form part.

7. A chain comprising a plurality of links articulated together, each joint of articulation comprising a pivot pin and a pair of cross bars having concave surfaces slidably fitting on said pivot pin, and exposed plane surfaces on the sides remote from the pivot pin, and each cross bar at a joint of articulation forming part of the link which extends from such joint in the opposite direction from said cross bar, said links also having longitudinal members which rigidly connect the two cross bars of each link.

8. A silent chain, comprising alternate wide and narrow links, each link comprising two spaced longitudinal members at the sides and two cross bars connecting and rigid with such longitudinal members, the longitudinal members of the wider links being located outside of and overlapping the longitudinal members of the narrow links, and the cross bars of the wider links extending through holes in the longitudinal members of the narrow links, which holes are sufficiently large to permit the desired articulation between the links, the cross bars at each joint of articulation being provided on their adjacent faces with concave cylindrical surfaces and on their remote faces with plane surfaces, the two plane surfaces on the cross bars of a link slanting in opposite directions and being at a fixed angle with each other, and a pivot pin at each joint of articulation, said pivot pin having a sliding fit on said concave cylindrical surfaces on the cross bars at such joint.

9. A chain, comprising alternate wide and narrow links, each link comprising two spaced longitudinal members at the sides and two cross bars connecting and rigid with such longitudinal members, the longitudinal members of the wider links being located outside of and overlapping the longitudinal members of the narrow links, and the cross bars of the wider links extending through holes in the longitudinal members of the narrow links, which holes are sufficiently large to permit the desired articulation between the links, the cross bars at each joint of articulation being provided on their adjacent faces with concave cylindrical surfaces, and on their remote faces with plane exposed surfaces for direct coöperation with a sprocket, and a pivot pin at each joint of articulation, said pivot pin having a sliding fit on said concave cylindrical surfaces on the cross bars at such joint.

10. A silent chain comprising a plurality of links, each of which has a longitudinal member and two cross bars at the ends of such longitudinal member, said links overlapping so that between the two cross bars of each link are located the two cross bars at the adjacent ends of the two adjacent links, one cross bar at each joint of articulation having on its face toward the other cross bar at such joint a concave cylindrical surface having as its axis the axis of articulation, and the link which articulates at such joint with the link provided with the cross bar having such concave surface, being provided with a part having a convex cylindrical surface interfitting with said concave cylindrical surface, each cross bar being provided with a plane surface which forms a fixed angle with the plane surface on the other cross bar of the same link and is located on the side toward the end of the link.

11. A chain comprising a plurality of links, each of which has a longitudinal member and two cross bars at the ends of such longitudinal member, said links overlapping so that between the two cross bars of each link, are located the two cross bars at the adjacent ends of the two adjacent links, each cross bar being provided on the side remote from the other cross bar at the same joint of articulation with an exposed plane surface, one cross bar at each joint of articulation having on its face toward the other cross bar at such joint a concave cylindrical surface having as its axis the axis of articulation, and the link which articulates at such joint with the link provided with the cross bar having such concave surface, being provided with a part having a convex cylindrical surface interfitting with said concave cylindrical surface.

In witness whereof, I have hereunto affixed my signature in the presence of the witnesses herein named.

WILLIAM A. ROCKENFIELD.

Witnesses:
R. G. LOCKWOOD,
MABEL HEINOLD.